(12) United States Patent
Yamamoto et al.

(10) Patent No.: US 9,061,330 B2
(45) Date of Patent: Jun. 23, 2015

(54) DISCHARGING MECHANISM AND A DISCHARGING METHOD OF SOLID MATTER

(75) Inventors: Seiichiro Yamamoto, Toyonaka (JP); Hiroshi Sano, Kai (JP); Shozo Kobayashi, Hokuto (JP); Katsushi Shibuya, Yawata (JP)

(73) Assignee: SUNTORY HOLDINGS LIMITED, Osaka-shi, Osaka (JP)

( * ) Notice: Subject to any disclaimer, the term of this patent is extended or adjusted under 35 U.S.C. 154(b) by 854 days.

(21) Appl. No.: 10/551,281

(22) PCT Filed: Mar. 26, 2004

(86) PCT No.: PCT/JP2004/004279
§ 371 (c)(1),
(2), (4) Date: Jul. 17, 2006

(87) PCT Pub. No.: WO2004/087306
PCT Pub. Date: Oct. 14, 2004

(65) Prior Publication Data
US 2007/0017552 A1 Jan. 25, 2007

(30) Foreign Application Priority Data
Mar. 28, 2003 (JP) ................................. 2003-090782

(51) Int. Cl.
*B08B 9/08* (2006.01)
*B08B 17/02* (2006.01)

(52) U.S. Cl.
CPC ........ *B08B 17/02* (2013.01); *B01J 2208/00761* (2013.01); *B08B 9/08* (2013.01)

(58) Field of Classification Search
None
See application file for complete search history.

(56) References Cited

U.S. PATENT DOCUMENTS

| 4,271,297 | A |   | 6/1981 | Hentsche et al. |
|-----------|---|---|--------|-----------------|
| 4,800,917 | A | * | 1/1989 | DePirro .................... 137/315.08 |
| 5,715,544 | A | * | 2/1998 | Huffman et al. ................... 4/420 |
| 6,000,413 | A | * | 12/1999 | Chen .......................... 134/102.2 |
| 6,235,147 | B1 | * | 5/2001 | Lee et al. ................. 156/345.21 |
| 2001/0000145 | A1 | * | 4/2001 | Kalenian ....................... 426/433 |

FOREIGN PATENT DOCUMENTS

| DE | 31 03 726 A1 | 8/1982 |
| EP | 1 099 472 A2 | 5/2001 |
| EP | 1 099 472 A3 | 5/2001 |
| GB | 1 514 824 | 6/1978 |
| JP | 10-072124 | 3/1998 |
| JP | 11-13125 | 1/1999 |
| JP | 2001-241850 | 9/2001 |
| JP | 2001-335154 | 12/2001 |

* cited by examiner

*Primary Examiner* — Michael Kornakov
*Assistant Examiner* — Ryan Coleman
(74) *Attorney, Agent, or Firm* — Drinker Biddle & Reath LLP

(57) ABSTRACT

The present invention provides a discharging method for discharging solid matter out of a container in which the solid matter is stored. In this discharging method of solid matter, a discharging liquid is supplied into the container 2 and thereby generates a spiral flow to cause the liquid and the solid matter exhibiting the spiral flow to be discharged from a discharge port 20 arranged in the bottom of said container 2. The spiral flow of the liquid and the solid matter can be generated by allowing the discharging liquid to flow tangentially into the container 2 specifically at a location in the vicinity of the bottom of said container 2.

3 Claims, 5 Drawing Sheets

DISCHARGING MECHANISM AND A DISCHARGING METHOD OF SOLID MATTER

FIELD OF THE INVENTION

The present invention relates to a discharging method and a discharging mechanism of solid matter and also to a storage unit for solid matter, comprising the same discharging mechanism.

DESCRIPTION OF THE PRIOR ART

In a production process of beverages, for example, typically a volume of solid matter, such as ground coffee or tea leaves, is stored in an extractor so as to effect the extraction of the beverages, in which practically all solid matter after the extraction is periodically discharged outside the extractor. One type of prior art equipment which allows to store and discharge the solid matter as described above comprises such a storage tank 30 as shown in FIG. 8, for example. This storage tank 30 is provided with a top lid and a bottom lid 32, wherein both lids can be opened. A screen-like partition plate 33 is disposed at a location adjacent to the top lid and another screen-like partition plate 34 is disposed at a location adjacent to the bottom lid, in the storage tank 30. The solid matter is delivered into the storage tank 30 via an inlet port 36 defined in an upper portion (below the partition plate 33) of a side wall thereof, where it is stored between the upper partition plate 33 and the lower partition plate 34. Then, after a reaction process, such as the extraction of the beverage is completed, the solid matter 35 stored in the storage tank 30 can be discharged from below the storage tank 30 by opening the bottom lid 32 and the lower partition plate 34. FIG. 8 illustrates the solid matter 35 stored in the storage tank 30 being discharged from below the storage tank 30 with the bottom lid 32 and the lower partition plate 34 opened. The solid matter 35 discharged from the storage tank 30 is transported by a transport means that is not shown, for example, on a belt conveyor, to a disposing station, where it is disposed. On the other hand, another type of prior art equipment allowing for the storing and discharging of the solid matter includes those disclosed in the Japanese Patent Laid-open Publication Nos. 2001-335154 (page. 3, FIG. 1) (Patent document 1) and Hei 10-72124 (Page. 3-4, FIG. 1) (Patent document 2).

The storage tank 30 as described above has, however, a drawback that the top lid 31 along with the upper partition plate 32 or the bottom lid 32 along with the lower partition plate 34 have to be opened, while a certain area of space is required for the top lid 31 and the bottom lid 32 to be opened. In addition, owing to the fact that the storage tank 30 is opened by manipulating the top lid 31 or the bottom lid 32, it is problematic that an environment around the storage tanks 30 could be contaminated depending on the property of the particular solid matter 35 and that effort would be required for ensuring safety in discharging operation. There is yet another problem associated with the storage tank 30, that some of foreign matters entering the storage tank 30.

Further, since the storage tank 30 is configured such that the bottom lid 32 and the lower partition plate 34 are opened so as to allow the solid matter 35 stored in the storage tank 30 to be discharged below the storage tank 30 simply with the aid of the gravity of the solid matter 35, the solid matter 35 tends to be left adhering to the inner wall of the storage tank 30, the top lid 31, the bottom lid 32, the upper partition plate 33 and the lower partition plate 34, which makes it extremely difficult to completely discharge the solid matter and accordingly requires that the interior of the storage tank 30 be cleaned after each discharge of the solid matter 35 to remove any volume of solid matter 35 deposited in the storage tank 30. This problem appears significant for the solid matter 35 that is highly viscous.

Yet further, since in the case of above described storage tank 30, the discharged solid matter 35 is transported by the transport means comprising bulky transport units, such as a hopper and/or a conveyer, it is required to provide a separate transport means and thus a large area of space for the installation of the transport means.

On the other hand, the equipment disclosed in the above-cited Patent document 1 employs the same configuration as that of the above-described prior art equipment, while the equipment disclosed in the Patent document 2 involves a cut-and-discharge apparatus of screw type for discharging sludge in the tank in a successive and quantitative manner by means of a single-shaft cut-and-discharge unit, and this type of apparatus, as is the case with the above-described prior art equipment, requires a separate transport means in addition to the difficulty in discharging the solid matter completely.

SUMMARY OF THE INVENTION

The present invention has been made in the light of the problems associated with the prior art as described above, and an object thereof is to provide a discharging mechanism and a discharging method of solid matter, in which the solid matter is stored and discharged in a closed-manner so as to ensure the prevention of environmental contamination as well as the safety in operation and in which a series of operations can be even automated, and also to provide a storage equipment for solid matter, which comprises the same discharging mechanism.

Another object of the present invention is to provide a discharging mechanism and a discharging method of solid matter, in which a liquid is injected into a volume of stored solid matter to generate a spiral flow therein, thereby allowing for most of solid matter to be discharged reliably and easily, while facilitating the cleaning work of a container in which the solid matter is to be stored, and also to provide a storage equipment for solid matter, which comprises the same discharging mechanism.

Yet another object of the present invention is to provide a discharging mechanism and a discharging method of solid matter allowing for a reduction and simplification of disposing space and also to provide a storage equipment for solid matter, which comprises the same discharging mechanism.

In an invention disclosed in claim 1, there is provided a discharging method for discharging solid matter from a container in which the solid matter is stored, the method characterized in comprising the steps of: supplying a discharging liquid into said container to generate a spiral flow of said liquid and the solid matter therein; and discharging the liquid and the solid matter present in the form of said spiral flow from a discharge port formed in the bottom of said container.

According to the above-defined discharging method of solid matter, it becomes possible to ensure prevention of environmental contamination and safety in operation, while enabling automated discharging operation of the solid matter. Further, by injecting the liquid into a volume of stored solid matter to generate the spiral flow thereof, the solid matter is prevented from being deposited on the interior wall and the like of the storage tank but most of the solid matter can be discharged reliably and easily, and the cleaning work of a container in which the solid matter is to be stored can be carried out easily, as well. Besides, a reduction and simplification of the disposing space will become feasible.

In the above-defined discharging method of solid matter, the spiral flow of the liquid and the solid matter may be generated by introducing the discharging liquid tangentially into the container in the vicinity of the bottom of the container. This allows for the spiral flow of the liquid and the solid matter to be generated reliably and efficiently.

In an invention defined in claim 3, there is provided a discharging mechanism of solid matter for discharging solid matter from a container in which the solid matter is stored, the mechanism comprising: a means for supplying a discharging liquid into said container to generate a spiral flow of the liquid and the solid matter therein; and a discharging means disposed in the bottom of the container for discharging the liquid and the solid matter which are in the state of the spiral flow out of the container.

According to the above-defined discharging mechanism of solid matter, it becomes possible to ensure prevention of environmental contamination and safety in operation, while enabling automated discharging operation of the solid matter. Further, by injecting the liquid into a volume of stored solid matter to generate the spiral flow thereof, the solid matter is prevented from being deposited on the interior wall and the like of the storage tank but most of the solid matter can be discharged reliably and easily, and the cleaning work of a container in which the solid matter is to be stored can be carried out easily, as well. Besides, a reduction and simplification of the disposing space will become feasible.

In the above-defined discharging mechanism of solid matter, the means for generating a spiral flow of the liquid and the solid matter may be disposed in a lower portion of a side wall of said container. This helps prevent the solid matter from being concentrated and thus forming an occlusion in the discharging means and facilitates a smooth discharging of the solid matter. Further, the discharging mechanism may include a liquid supply section capable of supplying the discharging liquid tangentially into the container. This allows for the spiral flow of the liquid and the solid matter to be generated reliably and efficiently. Further, the discharging means may be provided as a discharging valve comprising a discharging port disposed in the center of the bottom of the container and a valve body for opening and closing the discharging port. This enables a reliable discharging operation to be carried out and yet with a simple structure.

In an invention defined in claim 7, there is provided a storage equipment for solid matter, characterized in comprising: a container for storing solid matter; an inlet section arranged in the container for introducing the solid matter into the container; at least one liquid supply section arranged in the container for supplying liquid into the container to thereby generate a spiral flow of the solid matter and the liquid; and a discharging valve disposed in the bottom of the container for discharging the solid matter stored in the container along with the liquid, wherein the solid matter stored in the container is concentrated in a central region of the container by means of the spiral flow.

According to the above-defined storage equipment for solid matter, it becomes possible to ensure prevention of environmental contamination and safety in operation, while enabling automated discharging operation of the solid matter. Further, by injecting the liquid into a volume of stored solid matter to generate the spiral flow thereof, the solid matter is prevented from being deposited on the interior wall and the like of the storage tank and most of the solid matter can be discharged reliably and easily, and the cleaning work of a container in which the solid matter is to be stored can be carried out easily, as well. Besides, a reduction and simplification in the disposing space will become feasible.

In the above-defined storage equipment for solid matter, the means for generating the spiral flow of the liquid and the solid matter may be arranged in a lower portion of a side wall of the container. This helps prevent the solid matter from being concentrated and thus forming an occlusion in the discharging means, and facilitates a smooth discharging of the solid matter. Further, the storage equipment may include a liquid supply section capable of supplying a discharging liquid tangentially into the container. This allows for the spiral flow of the liquid and the solid matter to be generated reliably and efficiently. Still further, the discharging means may be provided as a discharging valve including a discharging port disposed in the center of the bottom of the container and a valve body for opening and closing the discharging port. This enables a reliable discharging operation to be carried out and yet with a simple structure.

DESCRIPTION OF THE PREFERRED EMBODIMENTS

Figure 1:
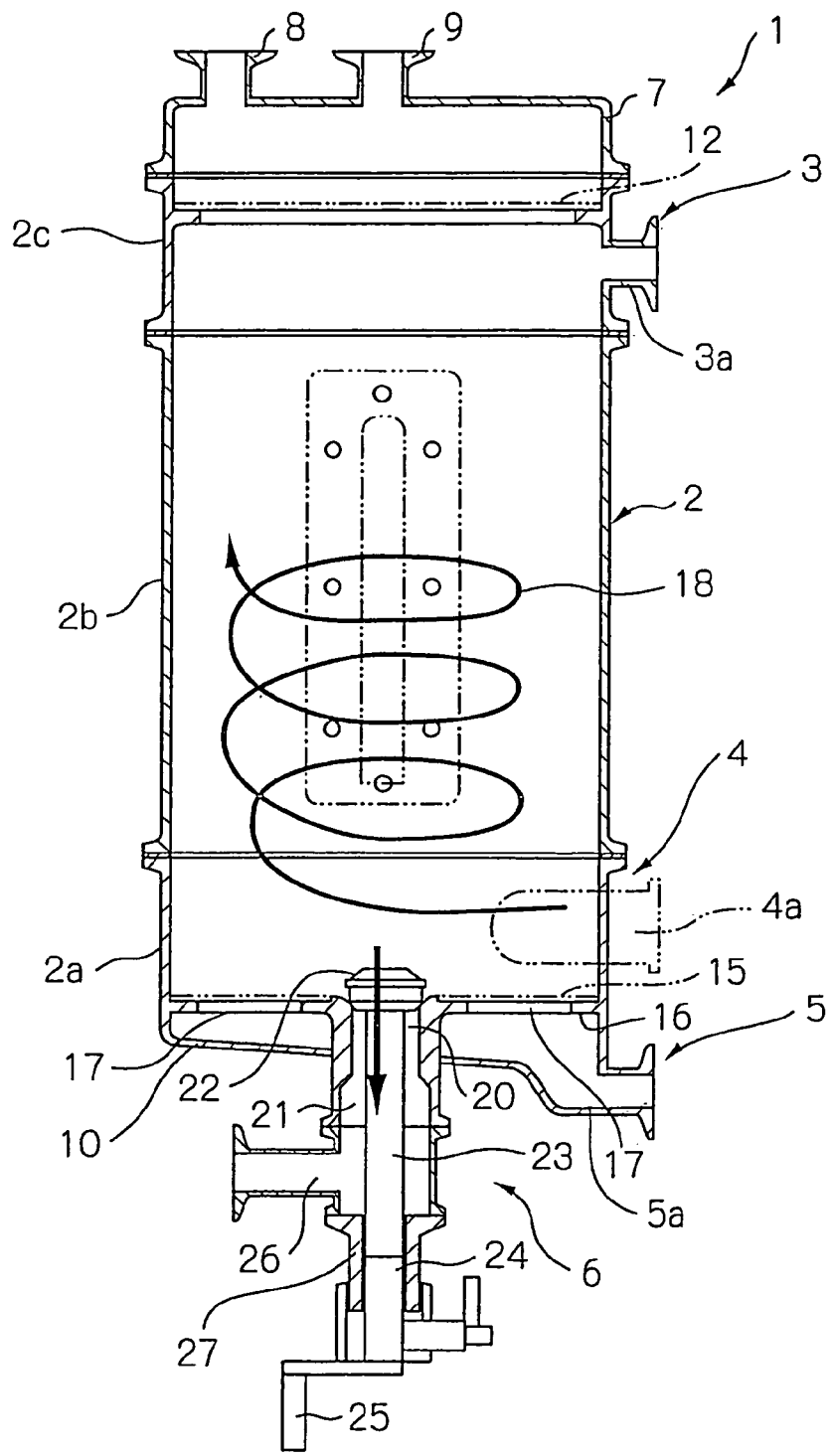
FIG. 1 is a longitudinal sectional view illustrating an embodiment of a storage equipment according to the present invention.
Figure 2:
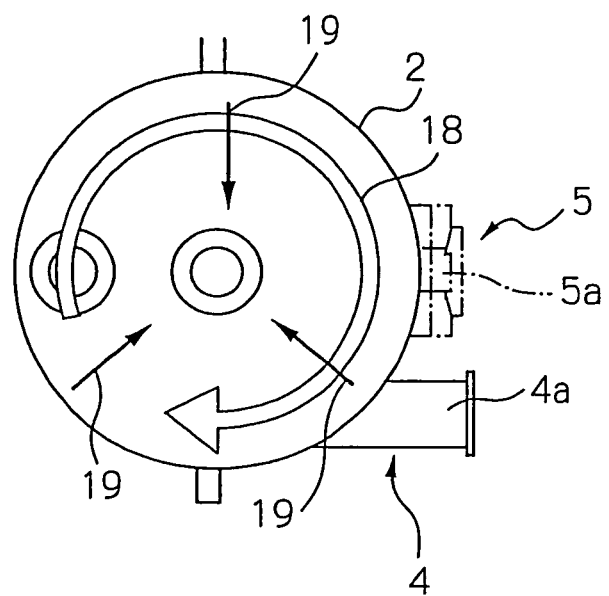
FIG. 2 is a cross sectional view illustrating the same embodiment.

Preferred embodiments of storage equipment having a discharging mechanism of solid matter according to the present invention and of a discharging method using the same equipment will now be described by taking the exemplary case applied to a beverage production line with reference to the attached drawings. FIG. 1 is a longitudinal sectional view of storage equipment 1 having a solid matter discharging mechanism according to the present invention, while FIG. 2 is a cross sectional view of the same storage equipment 1. The storage equipment 1 having the discharging mechanism represents the one applicable to a filter, a reactor, an extractor, an ion exchanger and a strainer, for example. As shown in FIG. 1, the storage equipment 1 comprises a storage container 2, an inlet section 3, a liquid supply section 4, a liquid discharge section 5 and a discharge valve 6 as its main components.

In a storage container 2 solid matter in the form of particle, pellet, chip, sand, powder or leaf, for example, including ground coffee, tea leaves, sands, pieces of activated charcoal, particles of resin, flesh of fruit, grains and wood chips, for example, can be stored; the storage container having a circular shape in its cross section. The storage container 2 in this embodiment comprises three sections: a lower section 2a, an intermediate section 2b and an upper section 2c, which are joined to each other by any known methods including welding, flange cramping, ferrule cramping, fitting, screwing and screw fastening, for example. The inlet section 3 is provided in a side wall of the upper section 2c for introducing the solid matter into the storage container 2. This inlet section 3 comprises an inlet pipe 3a fixed to the side wall of the upper section 2c. A top lid 7 adapted to open and close is disposed in a top of the storage container 2, and the solid matter can also be introduced into the storage container 2 by opening this top lid 7. A top wall of the top lid 7 is provided with a supply port 8 for supplying a liquid to be reacted with the solid matter (i.e., a reactive liquid) into the storage container 2 and an air port 9 for letting air out of the storage container 2. Further, a net-like member 12 is disposed below the top lid 7 in the storage container 2. This net-like member 12 is provided both to press the solid matter in the storage container 2 and to prevent back flow of the solid matter. In this regard, the net-like member 12 has no need to be included in the storage container 2, if the solid matter is only required to be stored up to a level below the net-like member, or in other similar cases.

A single liquid supply section 4 is arranged in a side wall of the lower section 2a of the storage container 2. This liquid supply section 4 comprises a supply pipe 4a fixed to the side wall in such a manner that a liquid (i.e., a discharging liquid), such as water, may be supplied into the storage container 2 tangentially with respect to the circular cross section of the storage container 2 along an interior wall thereof. This liquid supply section may be implemented, for example, as shown by reference numeral 4' in FIG. 3, by using a nozzle 4a extending into the storage container 2 with an end thereof in the container 2 bent to define a bent portion 4b' extending in parallel with a tangential direction with respect to the circular cross section of the storage container 2. Alternatively, in substitution for this, a liquid supply section as shown by reference numeral 4" in FIG. 4 may be employed. FIG. 4(a) is a plan view of a bottom wall 10 of the storage container 2 viewed from the top (in the inner side of the container), while FIG. 4(b) shows a cross section taken along the dashed line A-A in FIG. 4(a). As shown in FIGS. 4(a) and 4(b), the liquid supply section 4" comprises a pair of angled through holes 4d, 4e arranged in the bottom wall 10. The angled through holes 4d and 4e are formed in a point symmetric arrangement around a central portion of the bottom of the storage container 2 and oppositely angled with respect to each other (same direction along the circumference of the central portion). It is to be noted that in FIG. 4(b), the arrow 42 indicates the direction of liquid supply in the angled through hole 41. Although the liquid supply section 4' shown in FIG. 4 comprises a pair of angled through holes 4d, 4e, the liquid supply section may comprise a single angled through hole, that is either one of the angled through hole 4d or 4e. However, it is more preferable that the liquid supply section comprises the pair of angled through holes 4d, 4e, as shown in FIG. 4 from a reason that this configuration ensures a spiral flow to be generated rapidly and reliably. Further, an inlet velocity in supplying the discharging liquid can be adjusted by narrowing an orifice of a supply nozzle with, for example, an adaptor (not shown) provided in the orifice of the supply nozzle inside the container, so that the liquid supply section 4 can be adaptive to a variation in type and volume of the solid matter.

The liquid supplied through the liquid supply section 4 into the storage container 2 in the above-specified tangential direction along the inner surface of the storage container 2 can generate the spiral flow within the storage container 2 as indicated by the arrow 18 in FIGS. 1 and 2. This spiral flow of liquid can reach the upper level of the storage container 2, as the liquid volume in the storage container 2 is increased, so that it can cause the solid matter stored in the storage container 2 to rotate gradually in the direction of the spiral and thus to move and concentrate in the central region within the storage container 2, as indicated by the arrow 19 in FIG. 2. The liquid supply section 4 may be disposed in the bottom or the center of the storage container 2 in substitution for or in addition to the above-designated location, and such an arrangement can help ensure the above-described spiral flow to be generated reliably.

A discharge port 20 is formed in the center of a partition wall 16 of the storage container 2, and associatively, a plurality of fan-shaped openings 17 are formed in an annular arrangement around the discharge port 20. A net-like member 15 is provided over the openings 17 in the partition wall 16 of the storage container 2. In this regard, instead of the net-like member, a member in the form of a plate with slits or small through holes formed therein or in the form of sintered metal may be provided individually as desired. The liquid discharge section 5 in communication with the plurality of openings 17 in the annular arrangement is disposed in the bottom of the storage container 2. This liquid discharge section 5 comprises a discharge pipe 5a formed integrally with the bottom wall 10 of the storage container, which is open outwardly in the radial direction of the storage container 2, and the liquid discharge section 5 serves to discharge the liquid that has been introduced along with the solid matter from the inlet section 3 into the storage container 2 and/or the liquid delivered from the supply port 8 into the storage container 2. Since the net-like member 15 is provided above the openings 17, the solid matter within the storage container 2 can be prevented from being discharged from the liquid discharge section 5.

The discharge valve 6 is attached to the center of the partition wall 16 of the storage container 2 and it comprises a valve main body 21 defining a discharge port 20 whose upper end is open into the storage container 2 and which extends vertically (in FIG. 1), and a valve body 22 having a stem portion 23 positioned in the discharge port 20. An external thread 24 is formed in the stem portion 23 of the valve body 22 so as to be thread-engaged with an internal thread 27 formed in the valve main body, and thus the stem portion is adapted to rotate by turning a handle 25 attached to a lower end of the stem portion to thereby move the valve body along the vertical direction. A pipe connection 26 is disposed in a central portion of the valve main body 21, to which a discharge pipe (not shown) is to be connected. The valve body 22, when in a lower level, closes the upper opening end portion of the discharge port 20 to prevent the solid matter in the storage container from being discharged via the discharge port, and as the valve body moves upward, the opening end portion is opened to permit the out-flow of the solid matter. It is to be noted that the displacement of the stem portion may be carried out not manually as described above but with an electric motor or a pneumatic system.

An operation of the above-specified embodiment of the present invention will now be described. When the beverage production line is operated, the solid matter (not shown) is introduced along with the liquid from the production line through the inlet port 3 into the storage container 2, and the liquid is discharged to the outside from the liquid discharge section 5 (an introduction step). In this step, the solid matter may be introduced directly through a top opening after setting the lid 7 and the net-like member 12 into an open condition, or may be introduced through the supply port 8 after setting the net-like member into the open condition. Although the solid matter can be introduced up to a full level of the storage container 2, preferably the solid matter should be introduced by an amount of 90-95% to the full level (i.e., the volume defined between the net-like member 15 in the lower side and the net-like member 12 in the upper side of the storage container 2), because it can facilitate the discharging of the solid matter. Whether or not a predetermined amount of solid matter has been successfully stored in the storage container 2 may be detected by, for example, a sensor of known structure (not shown) provided on the side wall of the storage container or a flow meter or the like during the introduction of the solid matter. Then, the liquid to be reacted with the solid matter is supplied from the supply port 8 into the storage container 2 at any appropriate time. The liquid obtained as a result of the reaction can be taken out of the container from the liquid discharge section 5.

The liquid (discharging liquid), such as water, is supplied from the liquid supply section 4 tangentially with respect to the circular cross section of the storage container 2 along the inner surface of the side wall of the storage container 2 to generate the spiral flow in the storage container 2 (indicated by the arrow 18 in FIGS. 1 and 2). The solid matter stored in the storage container 2 gradually starts to rotate in the direction of the spiral with the aid of this spiral flow of the liquid, and when the liquid level of the discharging liquid rises up and above the top surface of the stored solid matter, a volume of solid matter moves and concentrates in the central region within the storage container 2, as indicated by the arrow 19 in FIG. 2 (a discharging liquid supply step).

In the discharging liquid supply step, once the volume of the liquid supplied to the storage container 2 has reached the predetermined level, the supply of the liquid is stopped. The liquid may be supplied until it reaches a predetermined specific level, and this specific level may be set to, for example, such a level of the liquid that can fill the container up to the top surface of the solid matter stored in the storage container 2. To control the volume of the discharging liquid to be supplied into the storage container, the flow rate of the liquid to be delivered into the container may be measured in advance or the liquid level in the storage container may be detected by a sensor so as to provide an appropriate control. At the time of liquid supply, the air trapped in the storage container 2 can be released from the air port 9. Further, at the time of liquid supply, the storage container 2 can be held in a pressurized condition by setting the air port 9 to a closed condition. This would facilitate the discharging of the solid matter with the aid of the pressure in the subsequent discharge step, as will be described later.

In the above-discussed discharging liquid supply step, before allowing the discharging liquid to flow through the liquid supply section 4 tangentially into the container, the discharging liquid may be supplied into the storage container 2 by, for example, supplying the discharging liquid into the bottom portion of the storage container 2 defined below the net-like member 15 through the liquid discharge section 5 or through a separately arranged auxiliary supply section for the discharging liquid (not shown), and in that case, after stopping the supply of the discharging liquid when the discharging liquid has reached the predetermined level above the net-like member 15 or while continuing the liquid supply, the discharging liquid may be allowed to flow from the liquid supply section 4 into the container so as to cause the spiral flow to be generated. Carrying out this operation allows for the solid matter to get loose prior to the supply of the discharging liquid in the tangential direction and facilitates the subsequent generation of the spiral flow by the flow-in of the discharging liquid in the tangential direction.

Figure 4:
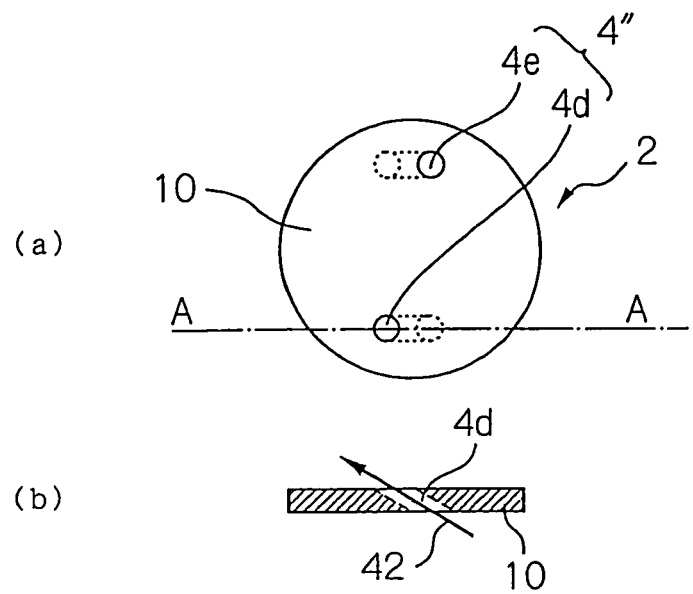
FIG. 4 is a schematic diagram illustrating another example of a liquid supply section applicable to the same embodiment.
Figure 5:
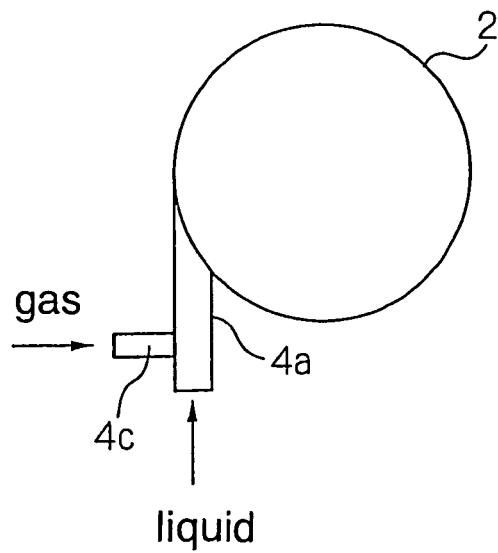
FIG. 5 is a schematic diagram illustrating an example of a gas supply section applicable to the same embodiment.
Figure 6:
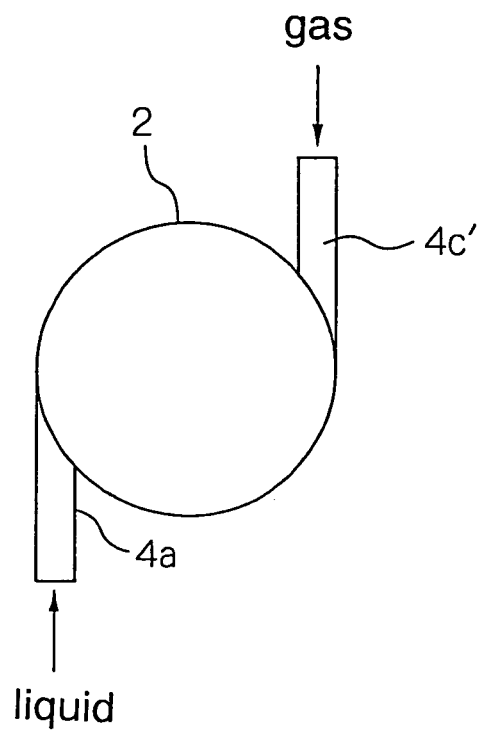
FIG. 6 is a schematic diagram illustrating another example of a gas supply section applicable to the same embodiment.
Figure 7:
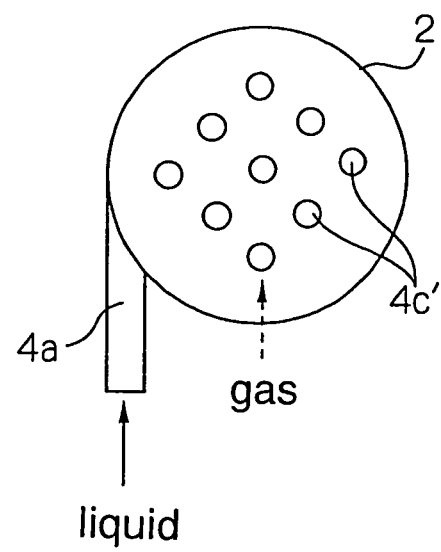
FIG. 7 is a schematic diagram illustrating yet another example of a gas supply section applicable to the same embodiment.
Figure 8:
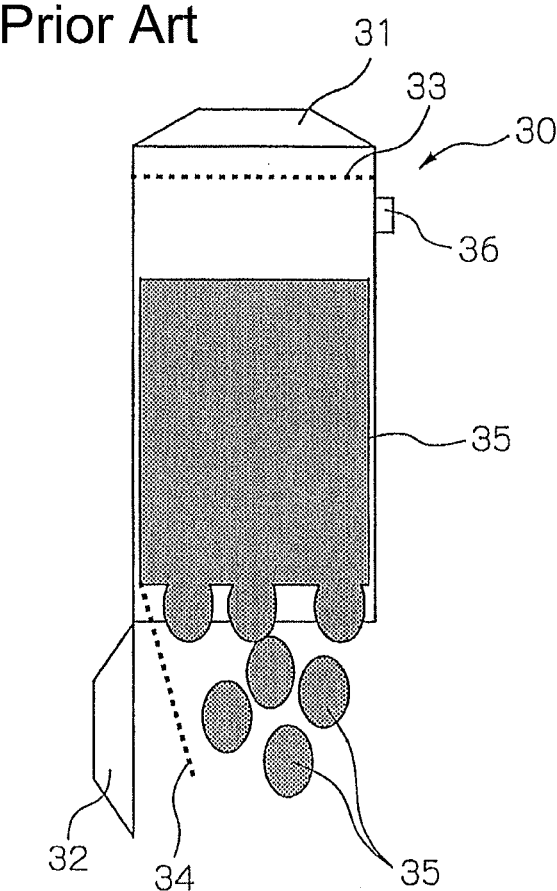
FIG. 8 is a schematic view showing an example of storage equipment in the prior art.
Figure 9:
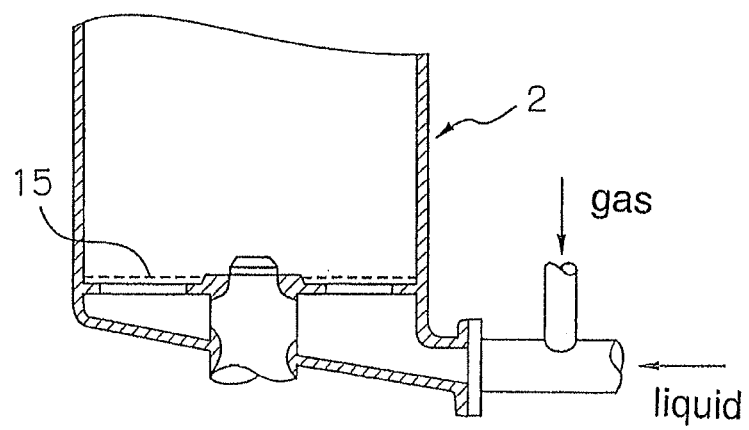
FIG. 9 is a diagram showing an exemplary manner for supplying a liquid and a gas into a storage container.

Further, in the discharging liquid supply step, the gas may be allowed to flow from the lower portion of the storage container 2 thereinto at the same time with the supply of the discharging liquid. By way of this, the solid matter is allowed to get loose with the aid of the gas moving upward in the storage container 2, and thus it becomes possible to generate the spiral flow of the solid matter more rapidly. One method of supplying the gas is shown in FIGS. 5 and 9, in which the liquid and the gas are mixed before being supplied and another method as shown in FIGS. 6 and 7, in which the liquid and the gas are independently supplied from separate supply ports. A gas supply nozzle 4c serving as the gas supply means as shown in FIG. 5 is attached to the nozzle 4a shown in FIG. 3 in such an orientation that the nozzle 4c extends at a right angle to the liquid supplying direction of the nozzle 4a, and so the gas supplied from the gas supply nozzle 4c is mixed with the liquid in the nozzle 4a so as to flow into the storage container 2 along with the liquid. In FIG. 9, the supply ports for the gas and the liquid are disposed at locations below the net-like member 15 in the bottom of the storage container 2. Besides, in the case of the liquid supply section 4" as shown in FIG. 4, by employing the configuration of the angled through holes 4d, 4e in communication with the gas supply means, it could be possible to supply the gas and the liquid, as they are mixed together, into the storage container 2.

Figure 3:
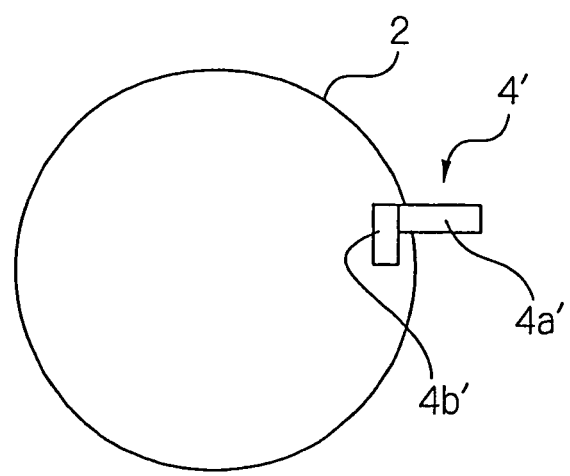
FIG. 3 is a schematic diagram illustrating an example of a liquid supply section applicable to the same embodiment.

Further, an air supply nozzle 4c' as shown in FIG. 6 is arranged in such an orientation that the nozzle 4c' is point symmetric around the central portion of the bottom of the storage container 2 with respect to the nozzle 4a shown in FIG. 3 and also their respective supplying directions are opposite to each other (but the same circumferential direction around the center of the spiral flow), and in this configuration, the gas and the liquid are supplied separately. Further, the gas supply means shown in FIG. 7 comprises a plurality of supply ports 4c" disposed in the bottom of the storage container 2, in which the gas and the liquid are supplied separately as with the case shown in FIG. 6.

The solid matter stored in the storage container 2 is then discharged by the discharge valve 6 (a discharge step). Specifically, the handle 25 of the discharge valve 6 is manually manipulated to move the valve body 22 upward to open the upper opening end of the discharge port 20 and thereby to allow the volume of solid matter concentrated in the central region in the storage container 2 with the aid of the spiral flow, or the volume of solid matter concentrated above the discharge port 20 to be discharged from the discharge port 20 and sent through the pipe connection 26 to a predetermined place. During the discharging of the solid matter, the liquid (discharging liquid) that has been supplied previously from the liquid supply section 4 into the storage container 2 is also discharged along with the solid matter. After the discharging of the solid matter having been completed, the liquid discharge section 5 is held in the open position to permit a volume of liquid remaining below the net-like member 15 within the storage container 2 to be discharged from the liquid discharge section 5 through the openings 17.

Although in the above description, the discharge step is carried out after a liquid supply stop step, the discharge step may be carried out even during the liquid supply step. That is, the operation for opening the discharge valve 6 in the discharge step may also be carried out at the same time the supply volume of the liquid supplied into the storage container 2 has reached a specified level during the discharging liquid supply step or when the volume of solid matter stored in the storage container 2 has started to rotate gradually with the aid of the spiral flow. In that case, it is possible in the discharge step to supply the discharging liquid continuously until the discharging of the solid matter has been completed. That is, the liquid supply stop step can be eliminated but the liquid supply step can be carried out continuously until the end of the discharge step. This can facilitate the smooth discharging of the solid matter.

According to the above embodiments, since the storage and discharge of the solid matter is carried out in the closed system (the system performed without opening the cover and the like of the storage container), it becomes possible to prevent environmental contamination, ensure safety in operation and prevent the entry of foreign matter. Further, since the solid matter is concentrated in the central region within the storage container 2, or above the discharge port 20, by the spiral flow of the discharging liquid so as to be discharged from the discharge port 20, the solid matter can be discharged completely from the interior of the storage container and thus the cleaning of the interior of the storage equipment can be carried out easily. Further, since the above-described configuration allows the solid matter to be discharged from the discharge port 20 and transported to a specified disposing facility through the pipe connection 26, a transport means comprising such a bulky transport section as a hopper and/or a conveyer in the conventional implementation can be eliminated, thus allowing for the reduction in the disposing cost by reducing the disposing space and simplifying the disposing process.

The present invention is not limited to the equipment for storing solid matter, such as ground coffee and tea leaves, in the field of beverage industry but may be applicable to such a type of equipment for storing a variety of solid matter, including food, feeding stuff, fertilizer, dust, sludge, garbage, activated charcoal, particles of resin, sand, charcoal from bamboo, flesh of fruit, grains, wood chips and drugs, as well.

According to the present invention, the following effects could be provided.

(a) It becomes possible to prevent environmental contamination and ensure safety in operation as well as achieve automated processing, by employing the closed system in storing and discharging of solid matter.

(b) A liquid can be injected into a volume of stored solid matter to generate a spiral flow to thereby facilitate the discharging of the solid matter, while facilitating the cleaning of the container in which the solid matter is stored.

(c) A reduction and simplification of the disposing space can be achieved.

The invention claimed is:

1. A discharging method of solid matter for discharging solid matter stored in a container from a discharge port of said container, said method comprising the steps of:
   storing said solid matter in an intermediate section of said container;
   supplying a discharging liquid from a lower section of said container so as to generate an upward spiral flow of said liquid in order to generate an upward spiral flow of said solid matter in said intermediate section by said upward spiral flow of said liquid and to generate a concentration of said solid matter above the discharge port in a central region in said storage container, the discharge port being located on a rotational axis of the spiral flow and formed in a central region of a bottom of said container; and
   discharging said liquid and most of said solid matter present in the form of said upward flow from the discharge port formed in the central region of the bottom of said container such that said matter is discharged substantially completely from said container.

2. A discharging method of solid matter in accordance with claim 1, in which said upward spiral flow of said liquid and said solid matter is generated by introducing said discharging liquid tangentially into said container in the vicinity of said bottom of said container.

3. A discharging method of solid matter in accordance with claim 1, wherein said step of discharging said liquid further comprises:
   moving a valve body of the discharge port in an upward direction so as to open the discharge port of the container and to move the valve body into a lower section of the container.

* * * * *